United States Patent [19]

Steever et al.

[11] Patent Number: 4,479,817

[45] Date of Patent: Oct. 30, 1984

[54] PRESSURIZED HOT CYCLONE

[75] Inventors: Andrew B. Steever, Old Greenwich; Albert Vitin, Stamford, both of Conn.

[73] Assignee: Dorr-Oliver, Inc., Stamford, Conn.

[21] Appl. No.: 136,792

[22] Filed: Apr. 3, 1980

[51] Int. Cl.³ .............................................. B01D 53/24
[52] U.S. Cl. .................................. 55/267; 55/459 R; 209/211; 210/512.1
[58] Field of Search ............. 55/204, 267, 269, 459 R, 55/459 A, 459 B, 459 C, 459 D; 209/144, 211; 210/512 R

[56] References Cited

U.S. PATENT DOCUMENTS

| 3,273,320 | 9/1966 | Delaune et al. | 55/459 R X |
| 3,283,480 | 11/1966 | Szego | 55/459 R X |
| 3,327,456 | 6/1967 | Guber, Jr. et al. | 55/459 R X |
| 3,389,793 | 6/1968 | Leeman | 209/211 |
| 3,470,678 | 10/1969 | Clark et al. | 55/459 R X |
| 4,004,898 | 1/1977 | Kalen | 55/459 R X |
| 4,125,385 | 11/1978 | Rado et al. | 55/459 R X |

FOREIGN PATENT DOCUMENTS

| 542613 | 6/1957 | Canada | 55/459 R |
| 762070 | 11/1956 | United Kingdom | 55/459 A |

Primary Examiner—Robert Spitzer
Attorney, Agent, or Firm—Harold M. Snyder; Burtsell J. Kearns

[57] ABSTRACT

A cyclone for use at elevated temperature and pressure has a refractory lining and a metallic vortex finder supported by a thermal sleeve.

5 Claims, 1 Drawing Figure

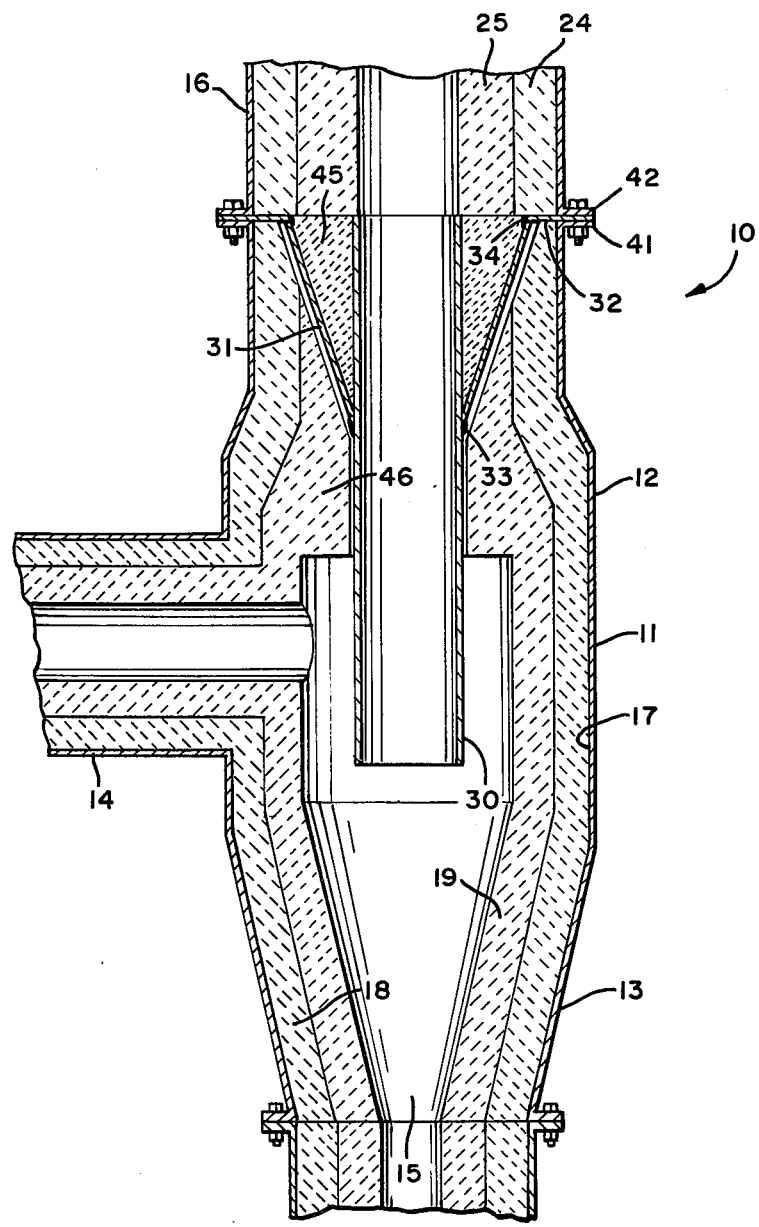

PRESSURIZED HOT CYCLONE

This invention is directed to an improved cyclone for service at elevated temperatures and pressures.

Cyclone dust collectors applied to fluidized bed processes must often handle incoming hot dusty gases at temperatures high enough to require refractory linings to protect the outer steel shell. However, in many cases, the vortex finder in these cyclones is made of an alloy metal because such an alloy member can hang free whereas common refractories are generally not capable of hanging free under tension but must be supported from below under compression.

Attaching the metallic vortex finder to the hot cyclone has been a troublesome problem in the past due to the differential expansion between the hot metal and the cold outer shell or between metal and refractory. Furthermore, there are no reliable simple methods of attaching relatively large hot metal parts directly to refractories.

In the past, vortex finders have been equipped with a flat ring flange at the upper end which rests on brackets attached to the inside of the shell, with the ring bolted to the brackets with slotted holes to allow the ring to expand, or, alternatively, the ring rests in a depression in the refractory lining inside the cyclone shell and is subject to loosening due to thermal expansion and vibration. These methods do not provide a gas-tight seal across the flange ring and will allow some gas by-passing near the outer shell. These methods can be tolerated for units running at essentially atmospheric pressure even though hot spots on the shell may tend to form at locations where there is gas by-passing or where the hot flange of the vortex finder comes near the shell.

However, when the hot cyclone is applied to a pressurized operation which may range upwards from 15 psig, the outer steel shell will be designed to some pressure vessel code, which limits maximum permissible shell temperatures from the safety aspect. In this situation, gas by-passing at or near the shell or the presence of a hot vortex finder flange next to the shell may result in unacceptably high shell temperature.

It is an object of this invention to provide a hot cyclone having an improved mounting arrangement for the vortex finder.

Other objects and advantages of the invention will become apparent in the following description, taken in conjunction with the accompanying drawing in which:

The FIGURE is a view in section of the hot cyclone of the invention showing the improved mounting arrangement for the vortex finder.

Generally speaking, the hot cyclone of the invention incorporates a vortex finder which is supported by a thermal sleeve device consisting of a thin-walled cone welded at its lower end to the metallic vortex finder and at the upper end of the cone to a flange ring clamped at the flanged outlet of the cyclone.

In the FIGURE, the hot cyclone 10 includes a pressure vessel 12 which comprises an upper cylindrical portion 11 joined to a lower portion 13 of inverted conical shape. A tangential inlet conduit 14 is provided in cylindrical portion 11 and an outlet 15 for separated material is provided at the lower end of conical portion 13. An exhaust gas conduit 16 is connected to the flanged upper end of cylindrical portion 11 to receive overflow gas from the pressure vessel 12. The pressure vessel 12 includes a metal shell 17 and one or more layers of refractory lining 18,19. The exhaust conduit 16 is also lined with one or more refractory layers 24,25.

Within the pressure vessel 12, a cylindrical metal vortex finder 30 is vertically positioned essentially axially thereof. A thermal sleeve 31 of inverted, generally conical configuration surrounds and is sealingly welded at its lowest point (as at 33) to the vortex finder 30. At the upper end of thermal sleeve 31 (essentially, the base of the conical thermal sleeve 31), the weld 34 seals the sleeve to the horizontally disposed ring member 32. The ring member 32 is clamped between flange 41 on the upper end of cylindrical portion 11 and flange 42 on the lower end of exhaust conduit 16 by bolts or other means. Thus, the vortex finder 30 depends from thermal sleeve 31 which, in turn, depends from ring member 32. The welding of the cone must be of high quality as thermal stresses are present.

While it might be thought that the vortex finder could readily be welded to a flat flange ring and clamped in the outlet flange of the cyclone, such a ring would warp and there would be very high stresses in the welded junction between vortex finder and flat ring. The use of a thin-walled cone avoids the warping of a flat ring around the vortex finder because the cone can expand axially as well as radially and there will be a temperature gradient along an element of the cone from the hot vortex finder to the cold outer clamp ring, which gradient will be much less than would exist in a radial flange attached directly to the vortex finder. With a lower thermal gradient, the thermal stresses, warping and heat loss to the outer shell will be lessened. All the while, a sufficiently rigid support for the vortex finder is provided. The thermal gradient in the cone can be controlled with suitable dimensions of the cone and choice of refractory insulations inside and outside (at 45 and 46, respectively) the cone.

When in operation, a pressure drop exists across the vortex finder support due to the action of the cyclone. The pressure below the support is greater than the pressure above. In pressurized operation a given size leak will pass an increasing weight of leakage gas as the operating pressure is raised. Thus, at high pressures it is essential to have no leakage. With the cyclone constructed in accordance with the invention, as long as the welds remain sound, there is no possibility of hot gas leaking around the outside of the clamped support ring without being detectable, thereby decreasing the chance of a shell or flange hot spot. Further, due to the long, thin section path of the cone element, the heat loss is diminished. The relatively thin cone also reduces the thermal stresses which may cause warping.

If the vortex finder should require replacement due to severe duty imposed on it, this can readily be accomplished by lifting out the old vortex finder and lowering a new one in its place, once the outlet conduit has been unbolted and removed from the top of the cyclone.

Although the present invention has been described in conjunction with a preferred embodiment, it is to be understood that modifications and variations may be resorted to without departing from the spirit and scope of the invention, as those skilled in the art will readily appreciate. Such modifications and variations are considered to be within the purview and scope of the invention and appended claims.

We claim:

1. A cyclone for high temperature pressurized applications comprising a metal pressure vessel having a generally cylindrical upper portion joined to an essentially conical lower portion, a tangential inlet conduit opening into the cylindrical portion of said vessel, an outlet for separated material at the apex of said conical portion of said vessel, a metal vortex finder of cylindrical configuration supported within said vessel by a generally conical thermal sleeve, said sleeve being welded at the upper end thereof to a ring member which is fixed relative to said pressure vessel at the upper end of said cylindrical portion and an exhaust conduit positioned to receive gases exiting upward through said vortex finder.

2. The cyclone of claim 1 wherein the pressure vessel is provided with a refractory insulation lining and refractory insulation is provided in the region between the inner conical surface of the thermal sleeve and the vortex finder, and said refractory lining is in contact with the conical outer surface of said thermal sleeve.

3. The cyclone of claim 2 wherein the exhaust conduit is provided with a refractory insulation lining and wherein said ring member extends outward between abutting ends of the refractory linings of said pressure vessel and said exhaust conduit to contact with the wall of said pressure vessel and means fixing said ring member relative to said pressure vessel.

4. A cyclone for high temperature pressurized applications comprising a metal pressure vessel lined with refractory insulation and having a generally cylindrical upper portion joined to an essentially conical lower portion, a tangential inlet conduit opening into the cylindrical portion of said vessel, an outlet for separated material at the apex of said conical portion of said vessel, a metal vortex finder of cylindrical configuration supported within said vessel by a generally conical thermal sleeve, refractory insulation filling the region between the inner conical surface of the thermal sleeve and said vortex finder, said refractory insulation lining of said pressure vessel being in contact with the conical outer surface of said thermal sleeve, said thermal sleeve being welded at the upper end thereof to a ring member which is fixed relative to said pressure vessel at the upper end of said cylindrical portion, said conical thermal sleeve providing a relatively long heat transfer path of low thermal gradient between said vortex finder and said ring member, and an exhaust conduit positioned to receive gases exiting upward through said vortex finder.

5. The cyclone of claim 4 wherein said exhaust conduit is provided with a refractory insulation lining and wherein said ring member extends outward between abutting ends of the refractory linings of said pressure vessel and said exhaust conduit to contact with the wall of said pressure vessel and means fixing said ring member relative to said pressure vessel.

* * * * *